United States Patent [19]

Huvey et al.

[11] Patent Number: 5,375,735
[45] Date of Patent: Dec. 27, 1994

[54] TANK OF LOW UNITARY WEIGHT NOTABLY USABLE FOR STOCKING FLUIDS UNDER PRESSURE AND THE MANUFACTURING PROCESS THEREOF

[75] Inventors: Michel Huvey, Bougival; Jacques Cheron, Maisons Lafitte, both of France

[73] Assignee: Institut Francais du Petrole, Rueil Malmaison, France

[21] Appl. No.: 229,008

[22] Filed: Apr. 18, 1994

Related U.S. Application Data

[63] Continuation of Ser. No. 794,021, Nov. 19, 1991, abandoned.

[30] Foreign Application Priority Data

Nov. 19, 1990 [FR] France ................................ 90 14490

[51] Int. Cl.5 .............................................. B65D 88/06
[52] U.S. Cl. .................................... 220/589; 220/587; 220/591; 220/441; 220/455; 220/457
[58] Field of Search .............. 220/587, 588, 589, 590, 220/591, 414, 441, 454, 455, 457, 586

[56] References Cited

U.S. PATENT DOCUMENTS

| | | | |
|---|---|---|---|
| 3,200,998 | 8/1965 | Mahar | 220/720 |
| 3,207,352 | 9/1965 | Reinhart, Jr. | 220/590 |
| 3,508,677 | 4/1970 | Laibson et al. | 220/590 |
| 3,776,409 | 12/1973 | Pearson | 220/414 |
| 4,018,333 | 4/1977 | Blackwood | 206/346 |
| 4,349,463 | 9/1982 | Flanigen | 206/0.7 |
| 5,020,358 | 6/1991 | Sharp | 220/445 |

*Primary Examiner*—S. Castellano
*Attorney, Agent, or Firm*—Antonelli, Terry, Stout & Kraus

[57] ABSTRACT

A tank or bottle including two end portions separated by a corrugated cylindrical body, with the corrugated cylindrical body being circumferentially reinforced. A longitudinal reinforcement is disposed along an entire outer surface of the tank with the exception of openings provided in the end portions for accommodating closure elements, whereby it is possible to reduce a thickness of the end portions and to reduce the overall weight of the tank.

17 Claims, 1 Drawing Sheet

TANK OF LOW UNITARY WEIGHT NOTABLY USABLE FOR STOCKING FLUIDS UNDER PRESSURE AND THE MANUFACTURING PROCESS THEREOF

This is a continuation of application Ser. No. 07/794,021 filed Nov. 19, 1991.

FIELD OF THE INVENTION

The present invention relates to a tank or bottle of low weight capable off withstanding high pressures for fluids under pressure.

BACKGROUND OF THE INVENTION

The main advantages of tanks of the aforementioned type are lightness and a sufficient resistance for withstanding the pressures exerted by fluids contained in the tank or bottle.

Conveying compressed gas or liquids under pressure, such as, for example, liquefied butane or propane, in pressure-resisting tight tanks or bottles, is well-known, with the tanks or bottles most often being made of steel such that the weight of the tank or bottle is at least equal to the weight of the contained fluid. Thus, the handling of the empty tanks or bottles is nearly as difficult as the handling of the full tanks or bottles, and that the transportation expenses for the empty tanks or bottles are substantially the same an the expenses incurred in transporting the full tanks or bottles.

The technical problem posed here is not evident because the features of lightness and pressure resistance are often incompatible.

Light tanks or bottles incapable of withstanding relatively high pressures and tanks or bottles requiring the use of very costly material have been proposed in the prior art.

To enable the general public to have access to tanks or bottles of the aforementioned type, materials of reasonable cost are used and, for example, unidirectional composites with a thermoplastic matrix are employed for manufacturing the tanks or bottles. The tank or bottle always comprises an inner sheath made of a metallic material, with the rain function of the sheath being to provide a tight or sealed inner liner. As a result of such manufacturing techniques, the thickness of the tank or bottle increases thereby contributing to the total weight.

In, for example, U.S. Pat. No. 4,589,562, a tank is proposed for withstanding high pressures by providing a composite winding around a cylindrical body portion thereof and over a portion of the respective opposed end portion. However, since the composite winding does not cover the entire end portions, the end portions are not sufficiently reinforced. Thus, it is not possible to decrease the thickness of the tank and enable a reduction in the weight thereof.

SUMMARY OF THE INVENTION

The aim underlying the present invention essentially resides in providing tanks or bottles of a lightweight construction while providing a pressure resistance identical to or greater than the resistance of conventional tanks or bottles.

In accordance with advantageous features of the present invention, two hemispherical or ellipsoidal end portions are separated by a circumferentially and longitudinally extending reinforced corrugated circular cylindrical body, with the end portions being supported by longitudinally extending reinforcements. The presence of the longitudinally extending reinforcements allows a reduction in a thickness of the respective end portions of the tank, while nevertheless providing a sufficient pressure resistance.

A method of manufacturing a circumferentially reinforced corrugated pipe is described in, for example, French patent 2,553,860 and corresponding U.S. Pat. No. 4,311,761.

By virtue of the features of the present invention, it is possible to realize the advantage of providing a uniform weight ranging between one-half and one-sixth of the weight of conventional steel tanks or bottles, while maintaining a pressure resistance identical to a pressure resistance of the conventional tanks or bottles.

The tank or bottle of the present invention results from a combination of shapes, the thicknesses and dimensions of the respective components, as well as from implementing appropriate technologies for manufacturing the same.

According to the present invention, a tank or bottle for storing fluids under pressure includes an inner sheath formed by two end portions separated by a corrugated cylindrical body and assembled to the cylindrical body. The respective end portions are provided with at least one opening and with closing means or means for communicating an interior@ of the tank or bottle with the outside. The closing or communicating means may, for example, be valves or a stopper and a valve. Means are provided for withstanding longitudinal traction, and the inner sheath of the cylindrical body comprises corrugations which may be circumferential or helicoidally shaped with a low pitch. Outer hollows of the corrugations of the inner sheath are filled with a composition comprising reinforcing fibers, and means for withstanding the longitudinal traction or longitudinal reinforcement surround the entire outer surface of the tank except for the openings provided in the respective end portions of the tank.

The longitudinal reinforcement may, for example, include fibers laid out in such a manner that the fibers are helicoidally wound around the bottle or tank, wound as a polar winding, and/or a braid material may be disposed on tie outer surface of the tank.

The process for manufacturing the tank comprises providing an inner sheath for the tank or bottle which includes two hemispherical or ellipsoidal end portions and a cylindrical body provided with circumferential corrugations, filling at least a part of a height of the hollow outer portions of the corrugated inner sheath with a composition comprising a fiber-reinforced stabilizable resin, subjecting the tank or bottle to a treatment for stabilizing the stabilizable composition, depositing on the entire outer surface of the tank, with the exception of the opening provided in the end portions, a longitudinal reinforcement.

The providing of the inner sheath can be achieved either through a manufacturing step where an extrudable material is moulded by extrusion-blowing in a mold having a wall for forming the cylindrical body, with circumferential corrugations and hemispherical or ellipsoidal end portions, or through a manufacturing step in which the hemispherical or ellipsoidal end portions are fixed by fastening means to the two ends of a corrugated cylindrical body, with the end portions including openings therein for accommodating stoppers and/or valves.

The extrudable material can be either a metal or a thermoplastic resin.

The resin may, for example, be a photocurable resin and the treatment step is achieved by exposing the assembled tank or bottle to the action of an ultraviolet ray lamp.

The resin may, for example, by a heat convertible resin and the assembled tank or bottle is maintained during the stabilization step in conditions allowing a crosslinking to take place.

The resin may, for example, be a thermosetting resin and the stabilization may be achieved by heating the assembled tank or bottle until a temperature allowing the hardening of the resin is reached.

The longitudinal reinforcement of the cylindrical body, which also provides support for the end portions includes fibers deposited on the outer surface of the tank by helicoidal or polar winding, and/or a braid may be set on the outer surface of the tank or bottle.

The longitudinal reinforcement may, for example, include an aramid winding impregnated with a thermoplastic elastomer, with the ends of the winding being fastened by gluing onto the ends of the tank or bottle.

After filling the hollow portion with the stabilizable resin, a sheath made of a material substantially non permeable to the resin may, for example, be deposited, in order to maintain the resin substantially in place in the hollow outer portions before starting the depositing of the longitudinal reinforcement. In this manner, the stabilization treatment is performed at the same time as the winding. The deposited sheath can possibly be a simple helicoidal coil of a plastic or elastomeric band whose thickness can be low, since this band normally no longer has a part to play after the hardening of the resin.

In all the manufacturing processes described above, at least one end of the tank or bottle is fitted with a system for allowing a communication with the outside or providing a tight closing.

The tank or bottles for fluid under pressure obtained by the present invention may be externally lined with a protective layer, for example, by providing a thermoplastic elastomer after the depositing of the longitudinal reinforcement.

In order to reinforce the protection of the tank or bottle, the tank or bottle may be placed in a protective jacket including, for example, a container made of corrugated cardboard, with a space between the box and the tank or bottle being filled with an expansible composition such as a phenolic resin.

BRIEF DESCRIPTION OF THE DRAWINGS

Other objects, features, details and advantages of the present invention will become more apparent from the following description when taken in connection with the accompanying drawings wherein.

DETAILED DESCRIPTION

Figure 1:
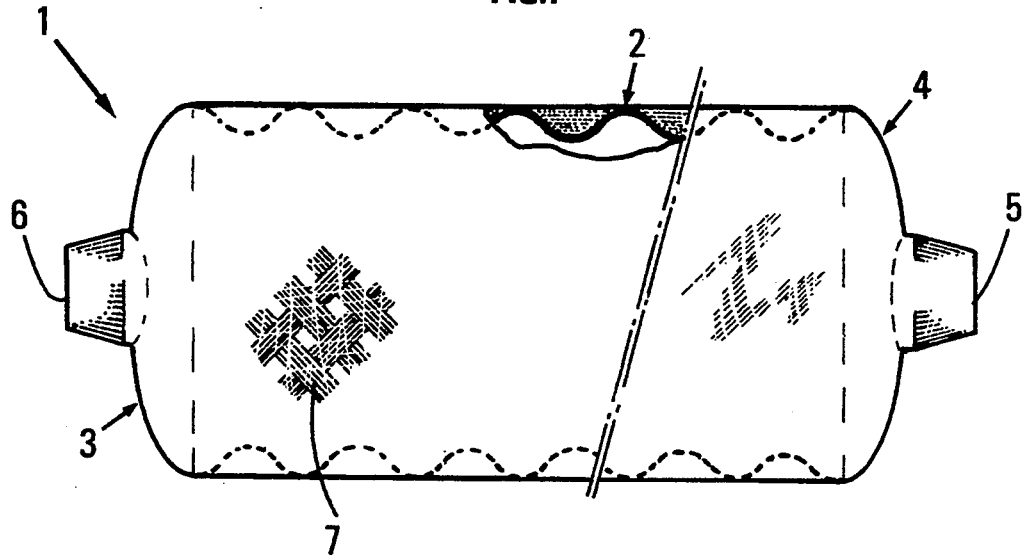
FIG. 1 is a partial cross-sectioned schematic view of a light weight tank or bottle for storing fluids under pressure constructed in accordance with the present invention.

Referring now to the drawings wherein like reference numerals are used throughout the various views to designate like parts and, more particularly, to FIG. 1, according to this figure, a tank 1 includes an inner sheath forming a cylindrical body 2, with two end portions 3, 4 being disposed at opposite ends of the cylindrical body 2. Valves or stoppers 5, 6 are respectively provided at the end portions 3, 4, and a longitudinal reinforcement 7 surrounds the tank 1 except in an area of openings accommodating the valves 5, 6. The end portions 3, 4 have an ellipsoidal or hemispherical shape, and the valves or stoppers 5, 6 are of a conventional construction.

The sheath forming the end portions 3, 4 can advantageously be fashioned of the same material as the corrugated sheath forming the cylindrical body 2, although it may be of a different material. By employing the same material for the sheath of the end portions 3, 4 and the inner sheath of the corrugated cylindrical body 2, it is possible to obtain a tight weld.

The connection between the end portions 3, 4 and the corrugated cylindrical body 2 will be achieved by gluing or by brazing when the materials are of a different type, except, or course, if the end portions 3, 4 and the corrugated cylindrical body 2 have been moulded in a single operation. The end portions 3, 4 may also be fashioned by thermoforming, injection or similar processes.

The longitudinal reinforcement 7 may, for example, include fibers deposited on the outer circumference of the tank 1 by polar winding or include a braid material arranged on the tank 1.

The provision of the longitudinal reinforcement 7 is to compensate for the pressures acting on the end portions 3, 4 of the cylindrical body 2. The presence of the longitudinal reinforcement on the end portions 3, 4 enables a reduction in the thickness of the end portions 3, 4.

Figure 2:
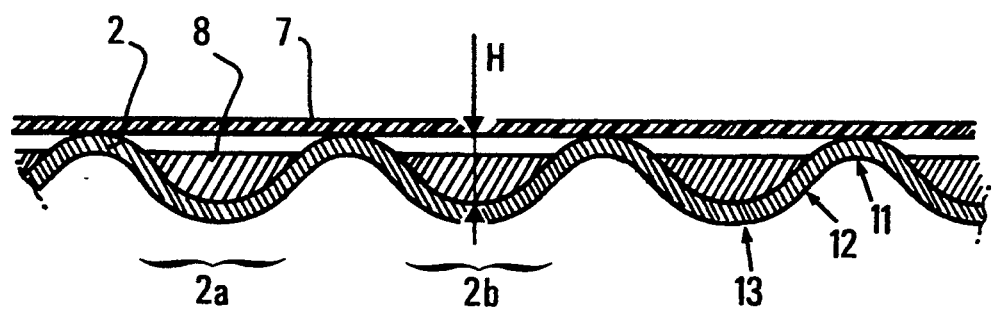
FIG. 2 is a partial longitudinal cross-sectional view of a portion of the corrugated cylindrical body of the tank of FIG. 1.

The construction of the inner sheath forming the cylindrical body 2 shown in FIG. 2 corresponds to the construction described in French application EN 90/05,507.

In FIG. 2, the hollow portions 2a, 2b of the corrugated inner sheath are filled with a resin reinforced with fibers 8 over almost a total height H thereof. It is essential to fill the hollow portions from the bottom or the outer face of said sheath up to a zone or area wherein the bending radius of the outer zone or area of the corrugation of the sheath becomes substantially constant, that is, varies by less than 10%. The corrugated inner sheath includes successive arcuate portions 11, 13, with the arcuate portions separated or not by substantially rectilinear portions 13, and corresponding to substantially conical zones or areas in a spatial representation.

The shapes constituted by the successive hollow and embossed portions can constitute successive rings or have a helicoidal form.

It is also possible to use a bellows type of construction without departing from the scope of the present invention. In this case, the hollow portion can be substantially filled over the total height thereof. In the same manner, the corrugation can be sinusoidal or approximately sinusoidal.

Figure 3:
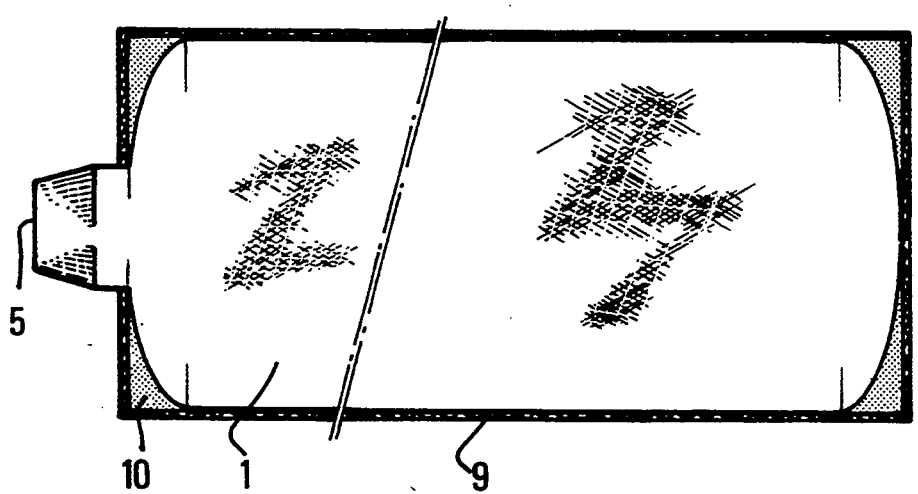
FIG. 3 is a schematic view of the light weight tank of FIG. 1 in use.

As shown in FIG. 3, the tank 1 is place in a container 9 made of corrugated cardboard. Only the closing means or the means for communicating with the outside, for example, the valve 5, is located outside the container 9. The empty space located between the walls off the container and the tank 1 is filled with, for example, a fire retardant material 10 such as an expansible composition based on a phenolic resin. The assembly of the container 9 and the material 10 form a protective covering against shocks and the heating of the assembly. Moreover, the assembly facilitates transportation and storage of the tank 1.

In the following description, what is termed circumferential reinforcing is an operation which allows a deposit of a composition comprising reinforcing fibers in the outer hollow of the corrugations of the inner sheath 2 of the tank 1, and longitudinal reinforcing of an operation through which the means for withstanding the longitudinal traction are deposited.

According to a first manufacturing procedure, a mold having a cylindrical portion including circumferential corrugations and hemispherical or ellipsoidal end portions is used. Through an extrusion-blow moulding process, tanks or bottles, of a slight permeable thermoplastic material, such as polyethylene glycol terephthalate, are produced. The inner sheath of a tank 1 is obtained thereby. Thereafter the end portions 3, 4 of tank 1 are provided with a valva and/or stopper or with two valves.

The circumferential reinforcing operation includes filling the hollows of the winding corrugations, followed by a stabilization treatment of the composition comprising reinforcing fibers.

During the filling, the tank constituted thereby is placed on a filament winding machine by which the hollow outer portions of the cylindrical portions of the inner sheath are filled with windings of glass filaments preimpregnated with a photocurable composition. The proportion by volume of the fibers is about 50%.

The tank obtained thereby is then subjected to treatment for stabilizing the photocurable composition comprising reinforcing fibers.

In the specific case of this manufacturing, the treatment results from subjecting the composition to an ultraviolet ray lamp for about five minutes so as to obtain a crosslinking of the photocurable composition. This treatment may be carried out when the tank or bottle is on the winding machine.

To carry out the longitudinal reinforcing operation, the tank is place again on the same winding machine by means of which a polyaramid layer (Kevlar or Twaron) preimpregnated with a 0.2 mm-thick partly hydrogenated thermoplastic elastomer of the Styrene-Isopropene-Styrene type is deposited. The material deposited thereby are stuck onto the ends of the tank by adding an elastomer solvent such as, for example, trichloroethylene. However, any other reliable holding material may be used to ensure a holding of the material of the layer on the tank or bottle.

By way of comparison with the prior art, the mass of the tank or bottle constructed in accordance with the present invention is 0.7 kg, which roughly corresponds to one-eighth of the mass of a conventional tank (6 kg) for the sane capacity, while maintaining the same pressure resistance.

In another manufacturing procedure, a stainless steel pipe, previously corrugated according to the technique described in French application EN 90/05,507 has the hemispherical or ellipsoidal end portions of the same material welded at respective ends thereof. The welding means used in this process are well-known and will therefore not be described. The thickness of the end portions is about 1 mm.

In the same manner as described above, the circumferential reinforcing operation comprises filling of the hollows of the corrugations, followed by a stabilization treatment of the composition comprising reinforcing fibers.

In order to fill the hollows of the corrugations, the tank or bottle is placed on a winding machine, which allows a filling of the outer grooves or corrugations of the corrugated inner sheath with a thermosetting glass fiber-epoxy resin in proportion by volume of 50%/50%. The tank or bottle is then subjected to a hardening treatment by placing the same in an oven for one hour at 90° C. and then for one hour at 140° C.

To carry out the longitudinal reinforcing operation, after cooling, the product is repositioned on the winding machine. An aramid winding for allowing a resistance to the longitudinal stress due to the internal pressure is then deposited by polar winding, i.e. by making the longitudinal reinforcement pass around the poles of the tank. It is also possible to provide a braid for serving as a longitudinal reinforcement.

By way of comparison with the prior art, the mass of the tank or bottle manufactured in accordance with the last-mentioned process is 2.1 kg, which roughly corresponds to one-third of the mass of a conventional tank (6 kg) for the same capacity, while maintaining the same pressure resistance. The bursting pressure off this tank is greater than 0.6 MPa.

In the same manner as in the manufacturing process described above, the tank obtained thereby can be wrapped with additional protection including a corrugated cardboard container and a fire retardant material.

Another way of manufacturing a tank or bottle includes, during the circumferential reinforcing operation, replacing the previous glass fiber-epoxy resin by a ribbon of glass fibers impregnated with a 2 mm-wide and a 0.35 mm-thick polyamide 12.

In this case the treatment for stabilizing the composition comprising reinforcing fibers consists Ln running the product obtained thereby through an air current heated up to 265° C. over a length sufficient for the resin to melt up to a depth of 0.01 mm. The hot air current traverses the surface of the composite already placed in a hollow outer portion of the part of the corrugated sheath upstream from the placing point, so that the surface of the composite already placed slightly melts or highly approaches the melting temperature thereof. The fiber ribbon placed thereby is knitted together with the one already in place at the placing point, which provides the reinforcement with an excellent cohesion, whereas it will show no adhesion on the corrugated metal sheath, insufficiently heated to allow such an adhesion, but still sufficiently to allow the resin to follow the exact shape of this sheath, thereby bringing the local stresses corresponding to the pressure back to the value of the average stresses which is naturally obtained with the hardenable composites used in the liquid state.

The invention is not limited to the use of any particular thermosetting resin. It will, for example, be possible to admix a resin with the hardener thereof to impregnate the filaments which will be used for filling the hollow outer portions of the corrugated pipe, and to heat thereafter. A vulcanization can also be achieved by filling the winding curves with filaments previously impregnated with latex with sulfur added.

It is also possible to use a phenol-formaldehyde resin, a melamine-formaldehyde resin, an urea-formaldehyde resin, an epoxy resin, a polyester or a vinylester resin, or an alkyd resin, or to set in the hollow portions of the corrugated pipe windings including a mixture of reinforcing fibers and fusible thermoplastic fibers of reinforcing fibers filled with fusible thermoplastic resin powder, then, after winding, to carry out a thermal treatment allowing the melting of the thermoplastic before starting the cooling which provides the hardening of the assembly.

It is also possible to heat a winding comprising reinforcing fibers and the fusible resin, for example, by a torch, just before the placing point in order to melt the resin just before depositing the impregnated winding. The later thermal treatment is then unnecessary. The fact that the circumferential reinforcement is discontinuous in the axial direction of the tank, and that it is not linked to the longitudinal reinforcement, prevents the occurrence of a microcracking phenomena.

Using composites with a thermoplastic matrix in all the processes described above can afford the advantage of suppressing the complementary stabilization operation after the winding, since this stabilization can be achieved by cooling during the winding itself.

We claim:

1. A tank for accommodating fluids under pressure, the tank comprising an inner sheath including a corrugated cylindrical body and two end portions assembled to said cylindrical body at opposite ends thereof, at least one of said end portions includes at least one opening and means disposed in said at least one opening for enabling a selective communication of an interior of the tank with the outside, and means disposed over an entire outer surface of the inner sheath except for said at least one opening for withstanding a longitudinal traction of the tank, wherein the corrugations of the corrugated cylindrical body have a shallow pitch, and wherein an outer portion of the corrugations of said corrugated cylindrical body is filled with a composition comprising reinforcing fibers for circumferentially reinforcing the corrugated cylindrical body.

2. A tank according to claim 1, wherein the composition comprising reinforcing fibers is one of an epoxy resin, a thermal setting resin or a heat convertible resin.

3. A tank according to claim 1, wherein the means for withstanding the longitudinal traction includes fibers wound in at least one of a polar or a helicoidal manner with a long pitch and a braid disposed on the outer surface of the tank.

4. A tank according to claim 1, wherein the inner sheath is fashioned of an extrudable material.

5. A tank according to claim 4, wherein the extrudable material is a thermoplastic material.

6. A tank according to claim 1, wherein the composition comprising reinforcing fibers is a photocurable resin stabilized by an exposure to an ultraviolet lamp.

7. A tank according to claim 1, wherein the composition is a heat convertible resin stabilized by being maintained at a stabilization temperature in conditions so as to enable crosslinking of the fibers.

8. A tank according to claim 1, wherein the composition is a thermosetting resin stabilized by heating to a temperature for allowing a hardening of the resin.

9. A tank according to claim 1, wherein the means for withstanding longitudinal traction includes an aramid winding impregnated with a thermoplastic elastomer, and wherein ends of the winding are fastened at securing points disposed at polar areas of the tank.

10. A tank according to claim 1, wherein a protective layer composed of a solution of thermoplastic elastomer surrounds the tank.

11. A tank according to claim 1, wherein the composition comprising reinforcing fibers is a resin, and wherein the cylindrical body is covered with a sheet made of a material substantially non-permeable to said resin so as to maintain the resin in place in the corrugations of the corrugated cylindrical body.

12. A tank according to claim 2, wherein at least one end of the tank is fitted with means for selectively allowing communication with an exterior of the tank while providing for a tight sealing thereof.

13. A tank according to claim 2, wherein the tank is disposed in a protective jacket.

14. A tank according to claim 2, wherein both of said end portions are provided with at least one opening respectively accommodating the means for enabling a selective communication of an interior of the tank with the outside.

15. A tank according to claim 2, wherein the end portions are fashioned of the same material as a material of the corrugated cylindrical body.

16. A tank according to claim 2, wherein the end portions are fashioned of a material different from a material of the corrugated cylindrical body.

17. A tank according to claim 2, wherein the end portions are fashioned by one of thermal forming and injection.

* * * * *